(12) United States Patent
Du et al.

(10) Patent No.: US 12,335,916 B2
(45) Date of Patent: Jun. 17, 2025

(54) PAGING CYCLE ADJUSTING METHOD, STORAGE MEDIUM, AND ELECTRONIC TERMINAL

(71) Applicant: JRD COMMUNICATION (SHENZHEN) LTD., Guangdong (CN)

(72) Inventors: Kai Du, Guangdong (CN); Lina Yang, Guangdong (CN); Fan Zhang, Guangdong (CN); Tao Li, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 385 days.

(21) Appl. No.: 17/995,113

(22) PCT Filed: May 11, 2020

(86) PCT No.: PCT/CN2020/089564
§ 371 (c)(1),
(2) Date: Sep. 30, 2022

(87) PCT Pub. No.: WO2021/203509
PCT Pub. Date: Oct. 14, 2021

(65) Prior Publication Data
US 2023/0180181 A1  Jun. 8, 2023

(30) Foreign Application Priority Data
Apr. 7, 2020 (CN) .......................... 202010265687.7

(51) Int. Cl.
*H04W 68/02* (2009.01)
(52) U.S. Cl.
CPC .................................. *H04W 68/02* (2013.01)

(58) Field of Classification Search
CPC ...................................................... H04W 68/02
(Continued)

(56) References Cited

U.S. PATENT DOCUMENTS

| 2001/0015963 A1* | 8/2001 | Tuomainen | H04W 52/0216 |
| | | | 370/510 |
| 2006/0029011 A1* | 2/2006 | Etemad | H04W 68/02 |
| | | | 370/477 |

(Continued)

FOREIGN PATENT DOCUMENTS

| CN | 103687068 A | 3/2014 |
| CN | 106060910 A | 10/2016 |

(Continued)

OTHER PUBLICATIONS

International Search Report in International application No. PCT/CN2020/089564, mailed on Dec. 30, 2020.

(Continued)

*Primary Examiner* — Mark G. Pannell
(74) *Attorney, Agent, or Firm* — PV IP PC; Wei Te Chung

(57) ABSTRACT

A paging cycle adjusting method for an electronic terminal is provided. The method includes: determining, when the electronic terminal is switched from a first service mode to a second service mode, a service requirement of the second service mode; and adjusting a paging cycle of the electronic terminal to a target paging cycle according to the service requirement of the second service mode. A computer-readable storage medium and an electronic terminal are also provided.

9 Claims, 3 Drawing Sheets

(58) Field of Classification Search
USPC ........................................................ 455/458
See application file for complete search history.

(56) References Cited

U.S. PATENT DOCUMENTS

| | | | |
|---|---|---|---|
| 2007/0042814 A1* | 2/2007 | Kakimoto | H04W 52/0258 455/574 |
| 2007/0238476 A1* | 10/2007 | Sharma | H04W 68/00 455/515 |
| 2008/0311933 A1* | 12/2008 | Lim | H04W 68/02 455/458 |
| 2010/0137007 A1* | 6/2010 | Kojima | H04W 52/0216 455/458 |
| 2010/0159959 A1* | 6/2010 | Santhanam | H04W 52/0216 455/458 |
| 2010/0248768 A1* | 9/2010 | Nakatsugawa | H04W 52/0225 455/73 |
| 2010/0261487 A1* | 10/2010 | Razdan | H04W 68/02 455/458 |
| 2011/0096706 A1* | 4/2011 | Ramasamy | H04W 68/02 455/458 |
| 2012/0122444 A1 | 5/2012 | Yoon et al. | |
| 2016/0142308 A1* | 5/2016 | Gage | H04W 4/70 370/392 |
| 2016/0309446 A1 | 10/2016 | Katagiri | |
| 2018/0338281 A1* | 11/2018 | Bangolae | H04W 68/02 |
| 2019/0069192 A1* | 2/2019 | Palenius | H04W 24/10 |
| 2019/0313366 A1 | 10/2019 | Shim et al. | |
| 2020/0053608 A1* | 2/2020 | Tao | H04W 36/0094 |
| 2020/0107373 A1* | 4/2020 | Roy | H04W 74/0833 |
| 2020/0113015 A1* | 4/2020 | Basu Mallick | H04W 52/0216 |
| 2020/0314685 A1* | 10/2020 | Jornod | H04W 48/16 |
| 2020/0404617 A1* | 12/2020 | Murray | H04W 16/28 |
| 2022/0201713 A1* | 6/2022 | Beale | H04L 5/0053 |
| 2022/0248466 A1* | 8/2022 | Fan | H04W 72/54 |
| 2022/0361011 A1* | 11/2022 | Uusitalo | H04W 24/02 |
| 2023/0041665 A1* | 2/2023 | Han | H04N 21/6181 |

FOREIGN PATENT DOCUMENTS

| | | |
|---|---|---|
| CN | 106465332 A | 2/2017 |
| CN | 108282803 A | 7/2018 |
| CN | 108282848 A | 7/2018 |
| CN | 108307547 A | 7/2018 |
| CN | 108616330 A | 10/2018 |
| CN | 108632995 A | 10/2018 |
| CN | 109451842 A | 3/2019 |
| CN | 110663285 A | 1/2020 |
| CN | 110831153 A | 2/2020 |
| WO | 2018188481 A1 | 10/2018 |

OTHER PUBLICATIONS

Written Opinion of the International Search Authority in International application No. PCT/CN2020/089564, mailed on Dec. 30, 2020.
Chinese Office Action issued in corresponding Patent Application No. 202010265687.7 dated Feb. 2, 2021, pp. 1-6.
Chinese Office Action issued in corresponding Patent Application No. 202010265687.7 dated Oct. 18, 2021, pp. 1-7.
POTEVIO Discussion on DRX enhancements for NR 3GPP TSG-RAN WG2 NR Ad Hoc R2-1700248, dated Jan. 19, 2017.
European Search Report in European application No. 20930592.9, mailed on Apr. 30, 2024.

* cited by examiner

PAGING CYCLE ADJUSTING METHOD, STORAGE MEDIUM, AND ELECTRONIC TERMINAL

CROSS REFERENCE TO RELATED APPLICATIONS

This application is a US national phase application based upon an International Application No. PCT/CN2020/089564, filed on May 11, 2020, which claims the priority of Chinese Patent Application No. 202010265687.7, entitled "PAGING CYCLE ADJUSTING METHOD AND DEVICE, STORAGE MEDIUM, AND ELECTRONIC TERMINAL", filed on Apr. 7, 2020 in the China National Intellectual Property Administration (CNIPA), the contents of which is are incorporated herein by reference in their entirety.

TECHNICAL FIELD

The present disclosure relates to a communication technology field, and more particularly to a page cycle adjusting method, a storage medium, and an electronic terminal.

BACKGROUND ART

A 5G mobile terminal can periodically perform hibernate and waking up processes according to a paging cycle. That is, the mobile terminal receives a paging message from a base station when waking up, and continues to hibernate after receiving the paging message.

There are two ways to obtain a time value of the paging cycle in the 3GPP specification. The first way is to obtain it from a system message SIBI issued by the base station, and the second way is to obtain it through an NAS message when the mobile terminal registers with a network. However, these two methods can only obtain a fixed paging cycle. When the mobile terminal enters different service modes, different service requirements of the mobile terminal cannot be met if the same paging cycle is used for receiving a paging message.

Technical Problem

Embodiments of the present disclosure provide a paging cycle adjusting method, a storage medium, and an electronic terminal capable of meeting different service requirements of the electronic terminal.

Technical Solution

In a first aspect, an embodiment of the present disclosure provides a paging cycle adjusting method for an electronic device. The method includes:
  determining, when the electronic terminal is switched from a first service mode to a second service mode, a service requirement of the second service mode; and
    adjusting a paging cycle of the electronic terminal to a target paging cycle according to the service requirement of the second service mode.
  In some embodiments of the present disclosure, the service requirement includes a latency requirement; and
    when the latency requirement of the second service mode is high, the target paging cycle is small.
  In some embodiments of the present disclosure, the service requirement includes a power consumption requirement; and
    when the power consumption requirement of the second service mode is high, the target paging cycle is large.
  In some embodiments of the present disclosure, the service requirement includes a latency requirement and a power consumption requirement;
    the adjusting the paging cycle of the electronic terminal to the target paging cycle according to the service requirement of the second service mode specifically includes:
    adjusting the paging cycle of the electronic terminal to a first target paging cycle, when the service requirement of the second service mode includes a first latency requirement and a first power consumption requirement;
    adjusting the paging cycle of the electronic terminal to a second target paging cycle, when the service requirement of the second service mode includes a second latency requirement and a second power consumption requirement; and
    adjusting the paging cycle of the electronic terminal to a third target paging cycle, when the service requirement of the second service mode includes a third latency requirement and a third power consumption requirement; and
    wherein the first latency requirement, the second latency requirement, and the third latency requirement are decreased sequentially, the first power consumption requirement, the second power consumption requirement, and the third power consumption requirement are increased sequentially, and the first target paging cycle, the second target paging cycle, and the third target paging cycle are increased sequentially.
  In some embodiments of the present disclosure, the adjusting the paging cycle of the electronic terminal to the target paging cycle according to the service requirement of the second service mode specifically includes:
    determining the target paging cycle according to the service requirement of the second service mode;
    sending the target paging cycle to a base station;
    receiving confirmation information fed back by the base station according to the target paging cycle; and
    adjusting the paging cycle of the electronic terminal to the target paging cycle according to the confirmation information.
  In some embodiments of the present disclosure, the sending the target paging cycle to the base station specifically includes:
    switching a state of the electronic terminal from an RRC idle state to an RRC connection state; and
    sending the target paging cycle to the base station through an RRC message.
  In a second aspect, an embodiment of the present disclosure further provides a paging cycle adjusting device for an electronic terminal. The device includes:
    a determination module configured to determine, when the electronic terminal is switched from a first service mode to a second service mode, a service requirement of the second service mode; and
    an adjustment module configured to adjust a paging cycle of the electronic terminal to a target paging cycle according to the service requirement of the second service mode.
  In some embodiments of the present disclosure, the service requirement includes a latency requirement and a power consumption requirement; and
    when the latency requirement of the second service mode is high and the power consumption requirement is low, the target paging cycle is large.

In a third aspect, an embodiment of the present disclosure further provides a computer-readable storage medium. The storage medium stores a plurality of instructions. The instructions are loaded by a processor to perform steps of:

determining, when the electronic terminal is switched from a first service mode to a second service mode, a service requirement of the second service mode; and adjusting a paging cycle of the electronic terminal to a target paging cycle according to the service requirement of the second service mode.

In some embodiments of the present disclosure, the service requirement includes a latency requirement; and when the latency requirement of the second service mode is high, the target paging cycle is small.

In some embodiments of the present disclosure, the service requirement includes a power consumption requirement; and when the power consumption requirement of the second service mode is high, the target paging cycle is large.

In some embodiments of the present disclosure, the service requirement includes a latency requirement and a power consumption requirement;

when the processor performs the step of adjusting the paging cycle of the electronic terminal to the target paging cycle according to the service requirement of the second service mode, the processor specifically performs steps of:

adjusting the paging cycle of the electronic terminal to a first target paging cycle, when the service requirement of the second service mode includes a first latency requirement and a first power consumption requirement;

adjusting the paging cycle of the electronic terminal to a second target paging cycle, when the service requirement of the second service mode includes a second latency requirement and a second power consumption requirement; and adjusting the paging cycle of the electronic terminal to a third target paging cycle, when the service requirement of the second service mode includes a third latency requirement and a third power consumption requirement; and wherein the first latency requirement, the second latency requirement, and the third latency requirement are decreased sequentially, the first power consumption requirement, the second power consumption requirement, and the third power consumption requirement are increased sequentially, and the first target paging cycle, the second target paging cycle, and the third target paging cycle are increased sequentially.

In some embodiments of the present disclosure, when the processor performs the step of adjusting the paging cycle of the electronic terminal to the target paging cycle according to the service requirement of the second service mode, the processor specifically performs steps of:

determining the target paging cycle according to the service requirement of the second service mode;

sending the target paging cycle to a base station;

receiving confirmation information fed back by the base station according to the target paging cycle; and adjusting the paging cycle of the electronic terminal to the target paging cycle according to the confirmation information.

In some embodiments of the present disclosure, when the processor performs the step of sending the target paging cycle to the base station, the processor specifically performs steps of:

switching a state of the electronic terminal from an RRC idle state to an RRC connection state; and sending the target paging cycle to the base station through an RRC message.

In a fourth aspect, an embodiment of the present disclosure further provides an electronic terminal including a processor and a memory. The processor is electrically connected to the memory. The memory is configured to store instructions and data. The processor is configured to perform steps of:

determining, when the electronic terminal is switched from a first service mode to a second service mode, a service requirement of the second service mode; and adjusting a paging cycle of the electronic terminal to a target paging cycle according to the service requirement of the second service mode.

In some embodiments of the present disclosure, the service requirement includes a latency requirement; and when the latency requirement of the second service mode is high, the target paging cycle is small.

In some embodiments of the present disclosure, the service requirement includes a power consumption requirement; and when the power consumption requirement of the second service mode is high, the target paging cycle is large.

In some embodiments of the present disclosure, the service requirement includes a latency requirement and a power consumption requirement;

when the processor performs the step of adjusting the paging cycle of the electronic terminal to the target paging cycle according to the service requirement of the second service mode, the processor specifically performs steps of:

adjusting the paging cycle of the electronic terminal to a first target paging cycle, when the service requirement of the second service mode includes a first latency requirement and a first power consumption requirement;

adjusting the paging cycle of the electronic terminal to a second target paging cycle, when the service requirement of the second service mode includes a second latency requirement and a second power consumption requirement; and adjusting the paging cycle of the electronic terminal to a third target paging cycle, when the service requirement of the second service mode includes a third latency requirement and a third power consumption requirement; and wherein the first latency requirement, the second latency requirement, and the third latency requirement are decreased sequentially, the first power consumption requirement, the second power consumption requirement, and the third power consumption requirement are increased sequentially, and the first target paging cycle, the second target paging cycle, and the third target paging cycle are increased sequentially.

In some embodiments of the present disclosure, when the processor performs the step of adjusting the paging cycle of the electronic terminal to the target paging cycle according to the service requirement of the second service mode, the processor specifically performs steps of:

determining the target paging cycle according to the service requirement of the second service mode;

sending the target paging cycle to a base station;

receiving confirmation information fed back by the base station according to the target paging cycle; and adjusting the paging cycle of the electronic terminal to the target paging cycle according to the confirmation information.

In some embodiments of the present disclosure, when the processor performs the step of sending the target paging cycle to the base station, the processor specifically performs steps of:

switching a state of the electronic terminal from an RRC idle state to an RRC connection state; and sending the target paging cycle to the base station through an RRC message.

Advantageous Effects

In the paging cycle adjusting method, the storage medium, and the electronic terminal provided by the present disclosure, the service requirement of the second service mode is determined when the electronic terminal is switched from the first service mode to the second service mode. As such, the paging cycle of the electronic terminal can be adjusted to target paging cycle according to the service requirement of the second service mode to meet the service requirements of the electronic terminal in different service modes.

BRIEF DESCRIPTION OF DRAWINGS

Technical solutions and the advantageous effects of the present disclosure are best understood from the following detailed description with reference to the accompanying figures and embodiments.

DETAILED DESCRIPTION OF EMBODIMENTS

The following clearly and completely describes the technical solutions in the embodiments of the present disclosure with reference to the accompanying drawings in the embodiments of the present disclosure. The described embodiments are some rather than all of the embodiments of the present disclosure. All other embodiments obtained by those skilled in the art based on the embodiments of the present disclosure without creative efforts shall fall within the protection scope of the present disclosure.

Embodiments of the present disclosure provide a paging cycle adjusting method and device, a storage medium, and an electronic device.

Figure 1:
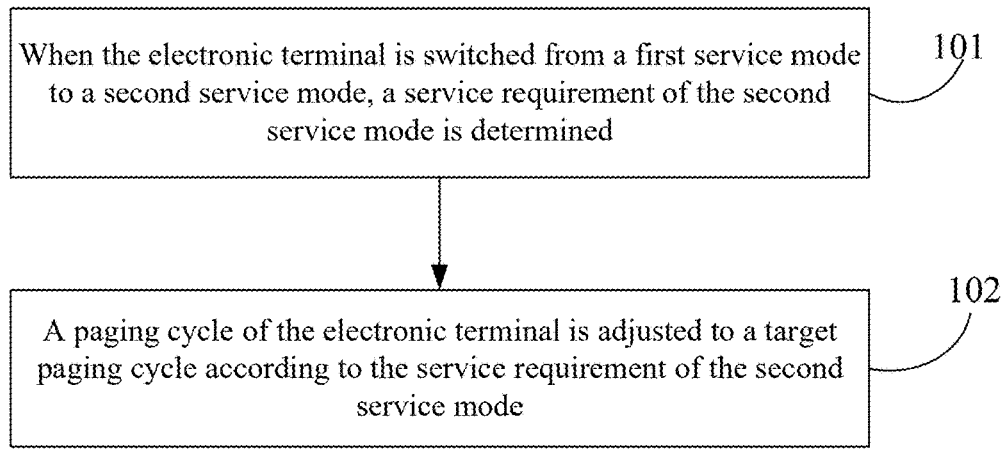
FIG. 1 illustrates a schematic flowchart of a paging cycle adjusting method provided by an embodiment of the present disclosure.

As shown in FIG. 1. FIG. 1 illustrates a schematic flowchart of a paging cycle adjusting method provided by an embodiment of the present disclosure. The paging cycle adjusting method is for an electronic terminal. A specific process of the paging cycle adjusting method can be described as follows.

In 101, when the electronic terminal is switched from a first service mode to a second service mode, a service requirement of the second service mode is determined.

In the present embodiment, when the electronic terminal is in different states, different service modes can be triggered. For example, service modes which can be triggered by 5G services in the electronic terminal include an Ultra Reliable Low Latency Communication (URLLC) service mode, an Enhanced Mobile Broadband (eMBB) service mode, and a Massive Machine Type Communication (mMTC) service mode. The first service mode and the second service mode can be any one of the URLLC service mode, the eMBB service mode, and the mMTC service mode, respectively, and the first service mode is different from the second service mode.

Different service mode corresponds to different requirements. A service requirement can include a delay requirement and a power consumption requirement. For example, the URLLC service mode can be applied to scenarios such as remote manufacturing, telemedicine, or Internet of Vehicles. Accordingly, a latency requirement is very high, but a power consumption requirement is not high. That is, the URLLC service mode has an extremely low tolerance for latency (low latency is required) but has an extremely high tolerate for power consumption (power consumption can be large). The mMTC service mode can be applied to scenarios such as environmental monitoring, smart street lights, or wearable devices. Accordingly, a latency requirement is not high, but a power consumption requirement is very high. That is, the mMTC service mode has an extremely high tolerance for latency (latency can be large) but has an extremely low tolerance for power consumption (low power consumption is required). The eMBB service mode can be applied to high-traffic mobile broadband service scenarios such as ultra-high-definition live videos anytime or anywhere, virtual reality, or high-speed mobile internets. Accordingly, a latency requirement and a power consumption requirement of the eMBB service mode are between the URLLC service mode and the mMTC service mode. That is, the eMBB service mode has certain requirements on latency and power consumption. A tolerance for latency in the eMBB service mode is higher than the tolerance for latency in the URLLC service mode but lower than the tolerance for latency in the mMTC service mode. A tolerance for power consumption in the eMBB service mode is lower than the tolerance for power consumption in the URLLC service mode but higher than the tolerance for power consumption in the mMTC service mode.

When the electronic terminal is switched from the first service mode to the second service mode, the service requirement of the second service mode can be determined. For example, the electronic terminal in a screen-off state can be in the mMTC service mode. Then, the electronic terminal can be in the eMBB service mode when the electronic terminal turns on a screen and enters a webcast room to watch an ultra-high-definition live video. That is, the first service mode is the mMTC service mode, and the second service mode is the eMBB service mode. When the electronic terminal is switched from the mMTC service mode to the eMBB service mode, the electronic terminal can obtain the service requirement of the eMBB service mode.

In 102, a paging cycle of the electronic terminal is adjusted to a target paging cycle according to the service requirement of the second service mode.

In the embodiment of the present disclosure, the service requirement can be pre-divided into a plurality of levels, and a target paging cycle corresponding to each level is set. After the service requirement of the second service mode is obtained, a level corresponding to the service requirement of the second service mode can be further determined, thereby adjusting the paging cycle of the electronic terminal to the target paging cycle corresponding to the level. Furthermore, when the service mode of the electronic terminal is not changed, there is no need to adjust the paging cycle of the electronic terminal.

The levels can be set according to levels of service requirements. For example, the level is higher when the service requirement is higher, or the level is lower when the service requirement is higher. A current of the electronic terminal is ranged between 50 mA and 80 mA when receiving a paging message, and a current is several mA in a hibernate state. That is, when the paging cycle is large, the power consumption of the electronic terminal is small but the latency in responding to the network is large. When the paging cycle is small, the power consumption of the electronic terminal is large but the latency in responding to the network is small. A small paging cycle means that a time interval is short when the electronic terminal receives a paging message, and a large paging cycle means that a time interval is long when the electronic terminal receives a paging message. Accordingly, when the service requirement includes a latency requirement, it can be set that the latency requirement is high, the level is high, and the corresponding paging cycle is smaller. When the service requirement includes a power consumption requirement, it can be set that the power consumption requirement is high, the level is low, and the corresponding paging cycle is large. When the service requirement includes a latency requirement and a power consumption requirement, it can be set that the latency requirement is high, the power consumption requirement is low, the level is high, and the corresponding paging cycle is small.

For example, the service requirement can be divided into three levels: a high level, a medium level, and a low level. A target paging cycle corresponding to the high level is the smallest, and a target paging cycle corresponding to the low level is the largest. When the service requirement of the first service mode of the electronic terminal is the medium level and the service requirement of the second service mode of the electronic terminal is the high level, the paging cycle of the electronic terminal is decreased to the target paging cycle corresponding to the high level. When the service requirement of the second service mode of the electronic terminal is the low level, the paging cycle of the electronic terminal is increased to the target paging cycle corresponding to the low level.

Specifically, the adjusting the paging cycle of the electronic terminal to the target paging cycle according to the service requirement of the second service mode includes:
  adjusting the paging cycle of the electronic terminal to a first target paging cycle, when the service requirement of the second service mode includes a first latency requirement and a first power consumption requirement;
  adjusting the paging cycle of the electronic terminal to a second target paging cycle, when the service requirement of the second service mode includes a second latency requirement and a second power consumption requirement; and
  adjusting the paging cycle of the electronic terminal to a third target paging cycle, when the service requirement of the second service mode includes a third latency requirement and a third power consumption requirement.

The first latency requirement, the second latency requirement, and the third latency requirement are decreased sequentially, the first power consumption requirement, the second power consumption requirement, and the third power consumption requirement are increased sequentially, and the first target paging cycle, the second target paging cycle, and the third target paging cycle are increased sequentially.

Determination of the first latency requirement, the second latency requirement, and the third latency requirement can be achieved by setting two latency tolerance thresholds. For example, When a latency tolerance of the second service mode is lower than a first delay tolerance threshold (that is, the latency requirement of the second service mode is extremely high), it is determined that the second service mode includes the first latency requirement. When the latency tolerance of the second service mode is higher than the first latency tolerance threshold and lower than a second latency tolerance threshold (that is, the latency requirement of the second service mode is medium), it is determined that the second service mode includes the second latency requirement. When the latency tolerance of the second service mode is higher than the second delay tolerance threshold (that is, the latency requirement of the second service mode is extremely low), it is determined that the second service mode includes the third latency requirement. Similarly, determination of the first power consumption requirement, the second power consumption requirement, and the third power consumption requirement can be achieved by setting two power consumption tolerance thresholds. For example, when a power consumption tolerance of the second service mode is higher than a second power consumption tolerance threshold (that is, the power consumption requirement of the second service mode is extremely low), it is determined that the second service mode includes the first power consumption requirement. When the power consumption tolerance of the second service mode is higher than a first power consumption tolerance threshold and lower than the second power consumption tolerance threshold (that is, the power consumption of the second service mode is medium), it is determined that the second service mode includes the second power consumption requirement. When the power consumption tolerance of the second service mode is lower than the first power consumption tolerance threshold (that is, the power consumption of the second service mode is extremely high), it is determined that the second service mode includes the third power consumption requirement.

The service requirement corresponding to the first latency requirement and the first power consumption requirement is the high level, so the paging cycle of the electronic terminal is adjusted to the first target paging cycle corresponding to the high level. The service requirement corresponding to the second latency requirement and the second power consumption requirement is the medium level, so the paging cycle of the electronic terminal is adjusted to the second target paging cycle corresponding to the medium level. The service requirement corresponding to the third latency requirement and the third power consumption requirement is the low level, so the paging cycle of the electronic terminal is adjusted to the third target paging cycle corresponding to the low level. The first target paging cycle is the smallest, and the third target paging cycle is the largest.

For example, when the second service mode is the URLLC service mode, the latency requirement is extremely high and the power consumption requirement is not high. This belongs to the first latency requirement and the first power consumption requirement, and thus the service requirement is the high level. The paging cycle of the electronic terminal is adjusted to the first target paging cycle. When the second service mode is the eMBB service mode, the latency requirement is medium and the second power consumption requirement is medium. This belongs to the second latency requirement and the second power consumption requirement, and thus the service requirement is the medium level. The paging cycle of the electronic terminal is adjusted to the second target paging cycle. When the second service mode is the mMTC service mode, the latency requirement is not high and the power consumption requirement is extremely high. This belongs to the third latency requirement and the third power consumption requirement, and thus the service requirement is the low level. The paging cycle of the electronic terminal is adjusted to the third target paging cycle.

It should be noted that the electronic terminal can directly adjust the paging cycle to the target paging cycle according to the service requirement of the second service mode, and then inform a base station of the target paging cycle. Alternatively, the electronic terminal can also determine the target paging cycle according to the service requirement of the second service mode and then adjust the paging cycle after negotiating and confirming with the base station.

Specifically, the adjusting the paging cycle of the electronic terminal to the target paging cycle according to the service requirement of the second service mode includes:
  determining the target paging cycle according to the service requirement of the second service mode;
  sending the target paging cycle to a base station;
  receiving confirmation information fed back by the base station according to the target paging cycle; and
  adjusting the paging cycle of the electronic terminal to the target paging cycle according to the confirmation information.

The target paging cycle can be determined by the above-mentioned method. For example, when the service requirement of the second service mode includes the first latency requirement and the first power consumption requirement, the first target paging cycle is determined. When the service requirement of the second service mode includes the second latency requirement and the second power consumption requirement, the second target paging cycle is determined. When the service requirement of the second service mode includes the third latency requirement and the third power consumption requirement, the third target paging cycle is determined.

As such, the determined target paging cycle is sent to the base station to negotiate with the base station. When the base station confirms the target paging cycle, the base station feeds back the confirmation information to the electronic terminal, and periodically sends a paging message to the electronic terminal according to the target paging cycle. After receiving the confirmation information from the base station, the electronic terminal can adjust the paging cycle to the target paging cycle and periodically receive the paging message sent by the base station according to the target paging cycle.

Further, the sending the target paging cycle to the base station specifically includes:
  switching a state of the electronic terminal from an RRC idle state to an RRC connection state; and
  sending the target paging cycle to the base station through an RRC message.

It should be noted that after the electronic terminal determines the target paging cycle, the electronic terminal can write, if the electronic terminal is in the Radio Resource Control (RRC) connection state, the determined target paging cycle into the RRC message and send the RRC message to the base station. If the electronic terminal is in the idle state, the electronic terminal first switches to the RRC connection state, and then writes the determined target paging cycle into the RRC message to send the RRC message to the base station. After the confirmation information fed back by the base station is received, the RRC connection state is switched to the RRC idle state to achieve a purpose of saving power.

It can be understood from the above that in the paging cycle adjusting method provided by the present disclosure, the service requirement of the second service mode is determined when the electronic terminal is switched from the first service mode to the second service mode. As such, the paging cycle of the electronic terminal can be adjusted to target paging cycle according to the service requirement of the second service mode to meet the service requirements of the electronic terminal in different service modes.

Figure 2:
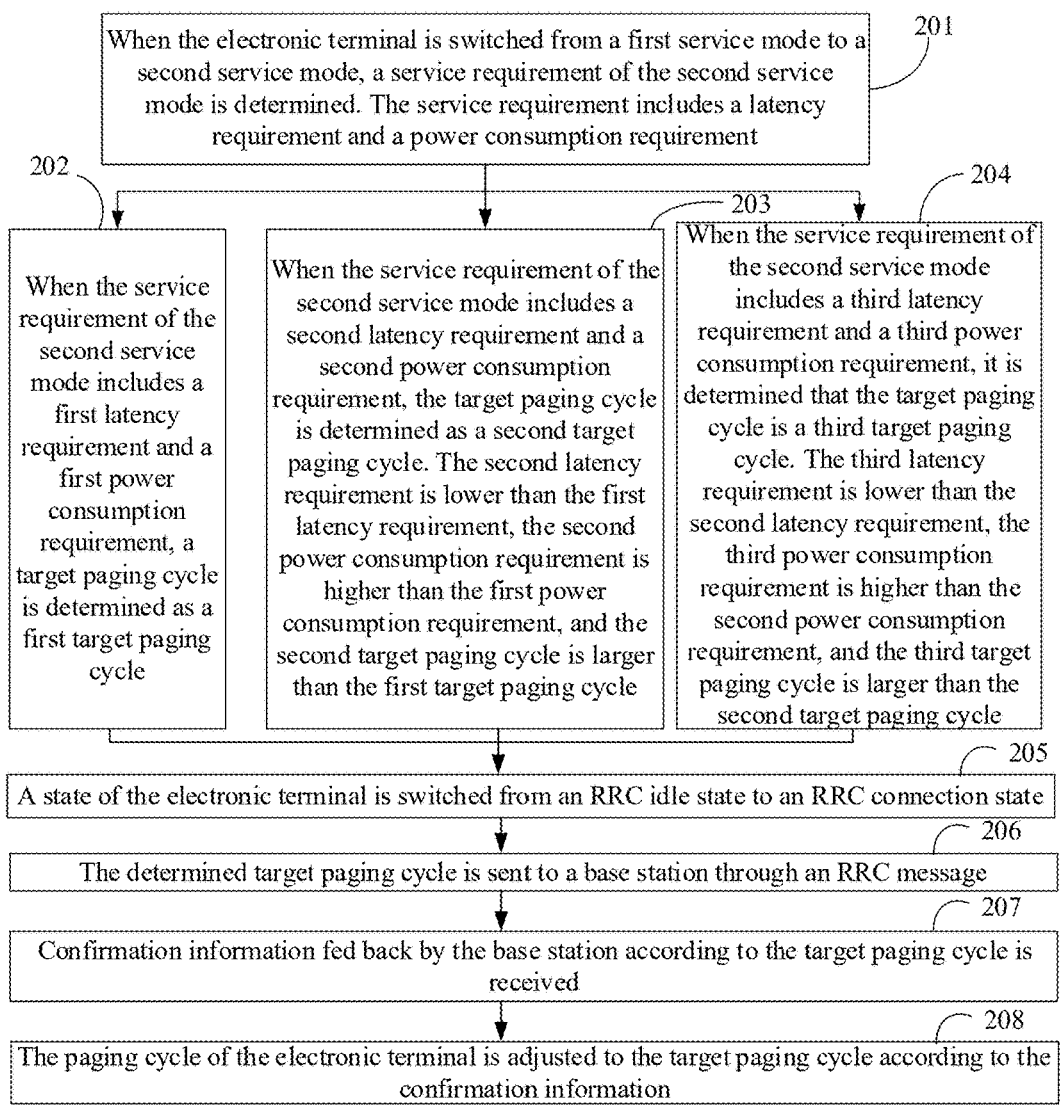
FIG. 2 illustrates a schematic flowchart of a paging cycle adjusting method provided by another embodiment of the present disclosure.

Please refer to FIG. 2. FIG. 2 illustrates a schematic flowchart of a paging cycle adjusting method provided by another embodiment of the present disclosure. The paging cycle adjusting method is for an electronic terminal. A specific process of the paging cycle adjusting method can be described as follows.

In 201, when the electronic terminal is switched from a first service mode to a second service mode, a service requirement of the second service mode is determined. The service requirement includes a latency requirement and a power consumption requirement.

For example, the first service mode and the second service mode of the electronic terminal can be any one of a URLLC service mode, an eMBB service mode, and an mMTC service mode, respectively.

In 202, when the service requirement of the second service mode includes a first latency requirement and a first power consumption requirement, a target paging cycle is determined as a first target paging cycle.

For example, when the electronic terminal is switched from the eMBB service mode or the mMTC service mode to the URLLC service mode, it is determined that the time latency requirement of the URLLC service mode is high and the power consumption requirement is low. Then, it is further determined that the target paging cycle corresponding to the URLLC service mode is the first target paging cycle A. The first target paging cycle A is smaller than a paging cycle corresponding to the eMBB service mode or the mMTC service mode.

In 203, when the service requirement of the second service mode includes a second latency requirement and a second power consumption requirement, the target paging cycle is determined as a second target paging cycle. The second latency requirement is lower than the first latency requirement, the second power consumption requirement is higher than the first power consumption requirement, and the second target paging cycle is larger than the first target paging cycle.

For example, when the electronic terminal is switched from the URLLC service mode or the mMTC service mode to the eMBB service mode, it is determined that the time latency requirement of the eMBB service mode is medium and the power consumption requirement is medium. Then, it is further determined that the target paging cycle corresponding to the eMBB service mode is the second target paging cycle B. The second target paging cycle B is larger than the paging cycle corresponding to the URLLC service mode and smaller than the paging cycle corresponding to the mMTC service mode.

In 204, when the service requirement of the second service mode includes a third latency requirement and a third power consumption requirement, it is determined that the target paging cycle is a third target paging cycle. The third latency requirement is lower than the second latency requirement, the third power consumption requirement is higher than the second power consumption requirement, and the third target paging cycle is larger than the second target paging cycle.

For example, when the electronic terminal is switched from the eMBB service mode or the URLLC service mode to the mMTC service mode, it is determined that the time latency requirement of the mMTC service mode is low and the power consumption requirement is high. Then, it is determined that the target paging cycle corresponding to the mMTC service mode is the third target paging cycle C. The third target paging cycle C is larger than the paging cycle corresponding to the eMBB service mode or the URLLC service mode.

In 205, a state of the electronic terminal is switched from an RRC idle state to an RRC connection state.

In 206, the determined target paging cycle is sent to a base station through an RRC message.

For example, the electronic terminal writes the first target paging cycle A, the second target paging cycle B, or the third target paging cycle C into the RRC message and sends the RRC message to the base station.

In 207, confirmation information fed back by the base station according to the target paging cycle is received.

For example, after parsing the target paging cycle in the RRC message, the base station feeds back the confirmation information to the electronic terminal and sends a paging message to the electronic terminal according to the parsed target paging cycle.

In 208, the paging cycle of the electronic terminal is adjusted to the target paging cycle according to the confirmation information.

For example, after receiving the confirmation information from the base station, the electronic terminal adjusts the paging cycle to the first target paging cycle A, the second target paging cycle B, or the third target paging cycle C, and receives the paging message sent by the base station according to the adjusted the target paging cycle to meet different service requirements of the electronic terminal.

According to the methods described in the above-mentioned embodiments, the present embodiment will be further described from the perspective of a paging cycle adjusting device. The paging cycle adjusting device can be integrated in an electronic device. The electronic device can be a server and can also be a terminal device including a desktop computer, a smart phone, a portable computer, a Personal Digital Assistant (PDA), a wearable device, a robot, an embedded device or the like.

Figure 3:
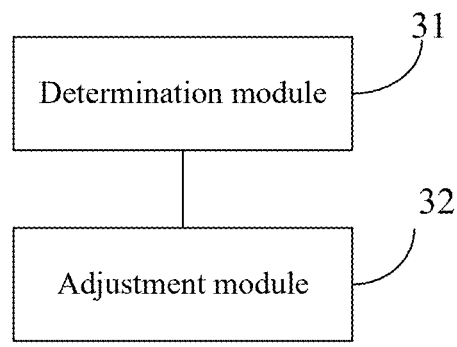
FIG. 3 illustrates a paging cycle adjusting device provided by an embodiment of the present disclosure.

Please refer to FIG. 3. FIG. 3 specifically illustrates a paging cycle adjusting device provided by an embodiment of the present disclosure. The paging cycle adjusting device can include: a determination module 31 and an adjustment module 32.

The determination module 31 is configured to determine, when an electronic terminal is switched from a first service mode to a second service mode, a service requirement of the second service mode.

The adjustment module 32 is configured to adjust a paging cycle of the electronic terminal to a target paging cycle according to the service requirement of the second service mode.

In some embodiments of the present disclosure, the service requirement includes a latency requirement.

When the latency requirement of the second service mode is high, the target paging cycle is small.

In some embodiments of the present disclosure, the service requirement includes a power consumption requirement.

When the power consumption requirement of the second service mode is high, the target paging cycle is large.

In some embodiments of the present disclosure, the service requirement includes a latency requirement and a power consumption requirement.

The adjustment module 32 is specifically configured to:
  adjust the paging cycle of the electronic terminal to a first target paging cycle, when the service requirement of the second service mode includes a first latency requirement and a first power consumption requirement;
  adjust the paging cycle of the electronic terminal to a second target paging cycle, when the service requirement of the second service mode includes a second latency requirement and a second power consumption requirement; and
  adjust the paging cycle of the electronic terminal to a third target paging cycle, when the service requirement of the second service mode includes a third latency requirement and a third power consumption requirement.

The first latency requirement, the second latency requirement, and the third latency requirement are decreased sequentially, the first power consumption requirement, the second power consumption requirement, and the third power consumption requirement are increased sequentially, and the first target paging cycle, the second target paging cycle, and the third target paging cycle are increased sequentially.

In some embodiments of the present disclosure, the adjustment module 32 is further configured to:
  determine the target paging cycle according to the service requirement of the second service mode;
  send the target paging cycle to a base station;
  receive confirmation information fed back by the base station according to the target paging cycle; and
  adjust the paging cycle of the electronic terminal to the target paging cycle according to the confirmation information.

In some embodiments of the present disclosure, the adjustment module 32 is further configured to:
  switch a state of the electronic terminal from an RRC idle state to an RRC connection state; and
  send the target paging cycle to the base station through an RRC message.

It can be understood from the above that in the paging cycle adjusting device provided by the present disclosure, the service requirement of the second service mode is determined when the electronic terminal is switched from the first service mode to the second service mode. As such, the paging cycle of the electronic terminal can be adjusted to target paging cycle according to the service requirement of the second service mode to meet the service requirements of the electronic terminal in different service modes.

Figure 4:
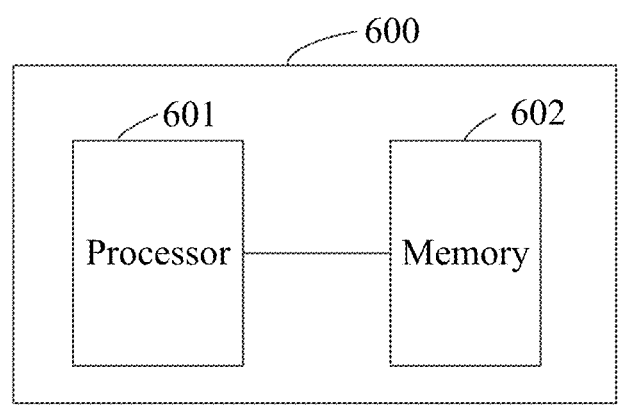
FIG. 4 illustrates a structural schematic diagram of an electronic terminal provided by an embodiment of the present disclosure.

Furthermore, an embodiment of the present disclosure further provides an electronic terminal. As shown in FIG. 4, the electronic terminal 600 includes a processor 601 and a memory 602. The processor 601 is electrically connected to the memory 602.

The processor 601 is a control center of the electronic terminal 600, is connected with all the parts of the whole electronic terminal by various interfaces and lines, and is configured to execute various functions of the electronic terminal and process the data by operating or loading application programs stored in the memory 602 and calling data stored in the memory 602, so as to carry out integral monitoring on the electronic terminal.

In the present embodiment, the processor 601 in the electronic terminal 600 loads instructions corresponding to processes of one or more application programs into the memory 602 according to the following steps, and the processor 601 executes the application programs stored in the memory 602 to implement various functions:

when the electronic terminal is switched from a first service mode to a second service mode, a service requirement of the second service mode is determined; and a paging cycle of the electronic terminal is adjusted to a target paging cycle according to the service requirement of the second service mode.

Figure 5:
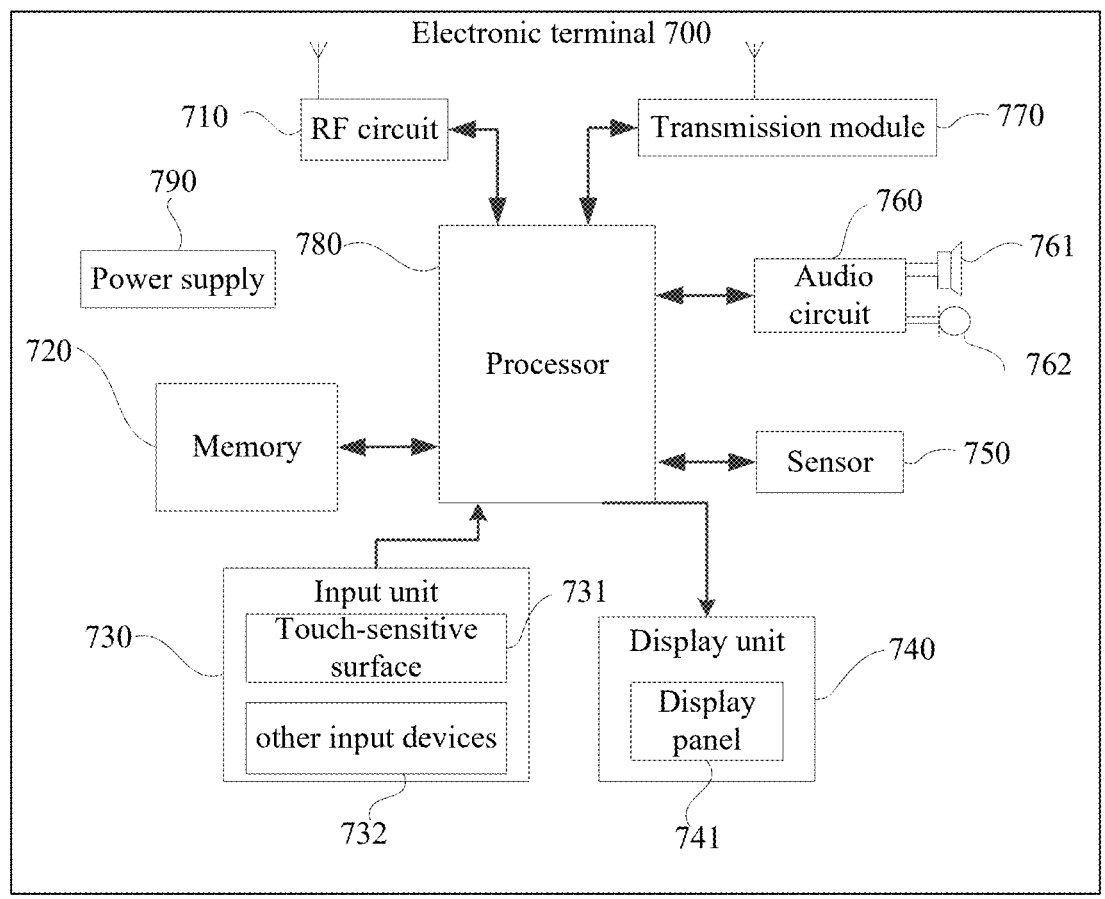
FIG. 5 illustrates a structural schematic diagram of an electronic terminal provided by another embodiment of the present disclosure.

Please refer to FIG. 5. FIG. 5 illustrates a structural schematic diagram of an electronic terminal provided by an embodiment of the present disclosure. The electronic terminal can be used for implementing the paging cycle adjusting method provided in any one of the above-mentioned embodiments. The electronic terminal can be connected to a network.

An RF circuit 710 is configured to receive and transmit electromagnetic waves and to realize conversions of the electromagnetic waves and electrical signals, thereby communicating with a communication network or any other device. The RF circuit 710 can include various conventional circuit elements used for performing these functions, for example, an antenna, a radio frequency transmitter, a digital signal processor, an encryption/decryption chip, a subscriber identification module (SIM) card, a memory and the like. The RF circuit 710 can communicate with various networks, for example, an internet, an intranet or a wireless network, or can communicate with any other device via a wireless network. The above-mentioned wireless network can include a cellular telephone network, a wireless local area network or a metropolitan area network. The above-mentioned wireless network can use various communication standards, protocols and technologies and can include but not limited to, Global System of Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, for example, Institute of Electrical and Electronics Engineers (IEEE) 802.11a, IEEE 802.11b, IEEE 802.11g and/or IEEE 802.11n), Voice over Internet Protocol (VoIP), Worldwide Interoperability for Microwave Access (Wi-Max), other protocols for E-mail, instant messaging and Short Messaging Service and other suitable communication protocols, and can include protocols which are not developed currently.

A memory 720 can be configured to store software programs and modules, for example, the program instructions/modules in the above-mentioned embodiments. A processor 780 executes various functional applications and data processing by operating the software programs and the modules stored in the memory 720. The memory 720 can include a high speed random access memory and also can include a non-volatile memory, such as one or more disk storage devices, a flash memory device or other non-volatile solid storage devices. In some embodiments, the memory 720 can further include a remote memory disposed corresponding to the processor 780. The remote memory can be connected to the electronic terminal 1200 via a network. Examples of the network include but are not limited to an internet, an intranet, a local area network, a mobile communication network and the combinations of them.

An input unit 730 can be configured to receive input number or character information and to generate keyboard, mouse, joystick, optical or trajectory ball signal inputs related to a user's setting and functional control. In detail, the input unit 730 can include a touch-sensitive surface 731 and other input devices 732. The touch-sensitive surface 731, also called a touch display screen or a touch panel, can be configured to detect touch operations of a user on or near the touch-sensitive surface 731 (for example, operations carried out by the user through any suitable objects or attachments, such as a finger, a touch pen and the like, on the touch-sensitive surface 731 or near the touch-sensitive surface 731) and to drive a corresponding device connected therewith according to a preset program. Optionally, the touch-sensitive surface 731 can include a touch detection device and a touch controller. The touch detection device detects the touch direction of the user, detects a signal caused by the touch operation, and transmits the signal to the touch controller. The touch controller receives touch information from the touch detection device, converts the touch information into a contact coordinate, and then transmits the contact coordinate to the processor 780 and can receive a command transmitted by the processor 780 and execute the command. Moreover, the touch-sensitive surface 731 can be one of various types, such as a resistance type, a capacitance type, an infrared type, a surface acoustic wave type and the like. Besides the touch-sensitive surface 731, the input unit 730 also can include the other input devices 732. In detail, other input devices 732 can include, but is not limited to, one or more of a physical keyboard, function keys (such as a volume control key, a switching key and the like), a trackball, a mouse, a joystick and the like.

A display unit 740 can be configured to display information input by the user or information provided for the user and various graphical user interfaces of the electronic terminal 700. The graphical user interfaces can be constituted by graphics, texts, icons, videos and any combinations of them. The display unit 740 can include a display panel 741. Optionally, the display panel 741 can be configured in forms of a Liquid Crystal Display (LCD), an Organic Light-Emitting Diode (OLED) and the like. Furthermore, the touch panel 731 can cover the display panel 741. When the touch-sensitive surface 731 detects a touch operation on or near it, the signal caused by the touch operation is transmitted to the processor 780 to determine the type of a touch event. Then, the processor 780 provides a corresponding visual output on the display panel 741 according to the type of the touch event. Although the touch-sensitive surface 731 and the display panel 741 in FIG. 5 are served as two independent parts for accomplishing input and output functions, it can be understood that the touch-sensitive surface 731 and the display panel 741 can be integrated to accomplish the input and output functions.

The electronic terminal 700 can further include at least one sensor 750, such as an optical sensor, a motion sensor and other sensors. In detail, the optical sensor can include an environmental light sensor and a proximity sensor. The environmental light sensor can adjust brightness of the display panel 741 according to the lightness of environmental light. The proximity sensor can generate an interruption when the electronic terminal 700 is flipped or closed or turned off. As one type of the motion sensor, an accelerometer sensor can detect the value of an acceleration in each direction (generally in three axial directions), can detect the value and the direction of gravity in a static state, which can be used in posture identifying functions (such as switching between a horizontal screen and a vertical screen, switching related to a game, and calibration on the posture of a magnetometer), vibration identifying functions (such as for pedometer and striking) and the like. Furthermore, a gyroscope, a barometer, a humidity meter, a thermometer, an infrared sensor and other sensors can be integrated into the electronic terminal 700, and explanations are not repeated herein.

An audio circuit 760, a speaker 761 and a microphone 762 can provide an audio interface between the user and the electronic terminal 700. The audio circuit 760 can transmit an electric signal obtained by converting received audio data to the speaker 761. The electric signal is converted into a sound signal to be outputted by the speaker 761. On the other hand, the microphone 762 converts a collected sound signal into an electric signal. The audio circuit 760 receives the electric signal and converts the electric signal into audio data. After the audio data is outputted to the processor 780 and is processed, it is transmitted, for example, to another terminal through the RF circuit 710, or is outputted to the memory 720 in order to be further processed. The audio circuit 760 can further include an ear plug hole for providing communication between an external ear phone and the electronic terminal 700.

The electronic terminal 700 can help the user to receive requests, send E-mails and the like by a transmission module 770 (for example, a Wi-Fi module). The transmission module 770 provides wireless broadband internet access for the user. Although the transmission module 770 is shown in FIG. 5, it should be understood that the transmission module 770 is not the necessary part of the electronic terminal 700 and can completely be omitted as required without changing the scope of essence of the present disclosure.

The processor 780 is a control center of the electronic terminal 700, is connected with all the parts of the whole electronic terminal by various interfaces and lines, and is configured to execute various functions of the electronic terminal 700 and process the data by operating or executing software programs and/or modules stored in the memory 720 and calling data stored in the memory 720, so as to carry out integral monitoring on the electronic terminal. Optionally, the processor 780 can include one or more processing cores. In some embodiments, the processor 780 can be integrated with an application processor and a modulation/demodulation processor. The application processor is mainly configured to process an operating system, at least one user interface, at least one application program and the like. The modulation/demodulation processor is mainly configured to process wireless communication. It can be understood that the modulation/demodulation processor can also be not integrated into the processor 780.

The electronic terminal 700 further includes a power supply 790 (such as a battery) for supplying power to each part. In some embodiments, the power supply can be logically connected with the processor 780 by a power supply management system, so as to implement functions of charge management, discharge management, power consumption management and the like by the power supply management system. The power supply 790 can further include one or more direct current or alternating current power supplies, recharging systems, power supply failure detection circuits, power converters or inverters, power supply status indicators and the like.

Although not shown in the FIG. 5, the electronic terminal 700 can further include a camera (for example, a front camera or a rear camera), a BLUETOOTH module, and the like which are not further described herein. In the present embodiment, the display unit of the electronic terminal is a touch screen display, and the electronic terminal further includes a memory and one or more programs. The one or more programs are stored in the memory and configured to be executed by one or more processors to perform instructions for executing the following operations contained in the one or more programs:

when the electronic terminal is switched from a first service mode to a second service mode, a service requirement of the second service mode is determined; and a paging cycle of the electronic terminal is adjusted to a target paging cycle according to the service requirement of the second service mode.

In specific implementations, the above-mentioned modules can be implemented as independent entities, and also can be combined in any combination and implemented as one or a plurality of entities. For the specific implementations of each module above, reference can be made to the above-mentioned method embodiments, and details are not further described herein.

Those skilled in the art can understand that all or some of the steps in various methods of the above-mentioned embodiments can be implemented through instructions or implemented through instructions controlling relevant hardware, and the instructions can be stored in a computer-readable storage medium and loaded and executed by a processor. To this end, an embodiment of the present disclosure provides a storage medium storing a plurality of instructions, and the instructions can be loaded by the processor, to perform the steps in the paging cycle adjusting method provided by any one of the embodiments of the present disclosure.

The storage medium can include: a read-only memory (ROM), a random access memory (RAM), a magnetic disk, an optical disc or the like.

Since the instructions stored in the storage medium can perform the steps of the paging cycle adjusting method provided by any one of the embodiments of the present disclosure, the instructions can implement advantageous effects which can be implemented by the paging cycle adjusting method provided by any one of the embodiments of the present disclosure. Details can be referred to the above-mentioned embodiments and are not described herein.

Specific implementations of each operation can be referred to the above-mentioned embodiments and are not described herein.

In summary, although the present disclosure discloses the above-mentioned preferred embodiments, the above-mentioned preferred embodiments are not intended to limit the present disclosure. Any modification, equivalent replacement, or improvement made by those skilled in the art without departing from the spirit and scope of the present disclosure should fall within the scope of the present disclosure. Therefore, the protection scope of the present disclosure is subject to the appended claims.

What is claimed is:

1. A paging cycle adjusting method, for an electronic terminal, the method comprising:

determining, when the electronic terminal is switched from a first service mode to a second service mode, a service requirement of the second service mode, wherein the service requirement comprises a latency requirement and a power consumption requirement;

adjusting a paging cycle of the electronic terminal to a first target paging cycle, when the service requirement of the second service mode comprises a first latency requirement and a first power consumption requirement;

adjusting the paging cycle of the electronic terminal to a second target paging cycle, when the service requirement of the second service mode comprises a second latency requirement and a second power consumption requirement; and adjusting the paging cycle of the electronic terminal to a third target paging cycle, when the service requirement of the second service mode comprises a third latency requirement and a third power consumption requirement; and wherein the first latency requirement, the second latency requirement, and the third latency requirement are decreased sequentially, the first power consumption requirement, the second power consumption requirement, and the third power consumption requirement are increased sequentially, and the first target paging cycle, the second target paging cycle, and the third target paging cycle are increased sequentially.

2. The paging cycle adjusting method of claim 1, wherein the adjusting the paging cycle of the electronic terminal to the target paging cycle according to the service requirement of the second service mode comprises:

determining the target paging cycle according to the service requirement of the second service mode;

sending the target paging cycle to a base station;

receiving confirmation information fed back by the base station according to the target paging cycle; and adjusting the paging cycle of the electronic terminal to the target paging cycle according to the confirmation information.

3. The paging cycle adjusting method of claim 2, wherein the sending the target paging cycle to the base station comprises:

switching a state of the electronic terminal from a radio resource control (RRC) idle state to an RRC connection state; and sending the target paging cycle to the base station through an RRC message.

4. A non-transitory computer-readable storage medium, wherein the storage medium stores a plurality of instructions, and the instructions are loaded by a processor to perform steps of:

determining, when an electronic terminal is switched from a first service mode to a second service mode, a service requirement of the second service mode, wherein the service requirement comprises a latency requirement and a power consumption requirement;

adjusting a paging cycle of the electronic terminal to a first target paging cycle, when the service requirement of the second service mode comprises a first latency requirement and a first power consumption requirement;

adjusting the paging cycle of the electronic terminal to a second target paging cycle, when the service requirement of the second service mode comprises a second latency requirement and a second power consumption requirement; and adjusting the paging cycle of the electronic terminal to a third target paging cycle, when the service requirement of the second service mode comprises a third latency requirement and a third power consumption requirement; and wherein the first latency requirement, the second latency requirement, and the third latency requirement are decreased sequentially, the first power consumption requirement, the second power consumption requirement, and the third power consumption requirement are increased sequentially, and the first target paging cycle, the second target paging cycle, and the third target paging cycle are increased sequentially.

5. The non-transitory computer-readable storage medium of claim 4, wherein the adjusting the paging cycle of the electronic terminal to the target paging cycle according to the service requirement of the second service mode comprises:

determining the target paging cycle according to the service requirement of the second service mode;

sending the target paging cycle to a base station;

receiving confirmation information fed back by the base station according to the target paging cycle; and adjusting the paging cycle of the electronic terminal to the target paging cycle according to the confirmation information.

6. The non-transitory computer-readable storage medium of claim 5, wherein the sending the target paging cycle to the base station comprises:

switching a state of the electronic terminal from a radio resource control (RRC) idle state to an RRC connection state; and sending the target paging cycle to the base station through an RRC message.

7. An electronic terminal, comprising a processor and a memory, wherein the processor is electrically connected to the memory, the memory is configured to store instructions and data, and the instructions are loaded by the processor to perform steps of:

determining, when the electronic terminal is switched from a first service mode to a second service mode, a service requirement of the second service mode, wherein the service requirement comprises a latency requirement and a power consumption requirement;

adjusting a paging cycle of the electronic terminal to a first target paging cycle, when the service requirement of the second service mode comprises a first latency requirement and a first power consumption requirement;

adjusting the paging cycle of the electronic terminal to a second target paging cycle, when the service requirement of the second service mode comprises a second latency requirement and a second power consumption requirement; and adjusting the paging cycle of the electronic terminal to a third target paging cycle, when the service requirement of the second service mode comprises a third latency requirement and a third power consumption requirement; and wherein the first latency requirement, the second latency requirement, and the third latency requirement are decreased sequentially, the first power consumption requirement, the second power consumption requirement, and the third power consumption requirement are increased sequentially, and the first target paging cycle, the second target paging cycle, and the third target paging cycle are increased sequentially.

8. The electronic terminal of claim 7, wherein the adjusting the paging cycle of the electronic terminal to the target paging cycle according to the service requirement of the second service mode comprises:
- determining the target paging cycle according to the service requirement of the second service mode;
- sending the target paging cycle to a base station;
- receiving confirmation information fed back by the base station according to the target paging cycle; and
- adjusting the paging cycle of the electronic terminal to the target paging cycle according to the confirmation information.

9. The electronic terminal of claim 8, wherein the sending the target paging cycle to the base station comprises:
- switching a state of the electronic terminal from a radio resource control (RRC) idle state to an RRC connection state; and
- sending the target paging cycle to the base station through an RRC message.

* * * * *